United States Patent [19]

Sublett

[11] Patent Number: 5,616,404
[45] Date of Patent: Apr. 1, 1997

[54] ORIENTABLE, HEAT SETABLE SEMI-CRYSTALLINE COPOLYESTERS

[75] Inventor: Bobby J. Sublett, Kingsport, Tenn.

[73] Assignee: Eastman Chemical Company, Kingsport, Tenn.

[21] Appl. No.: 541,746

[22] Filed: Oct. 10, 1995

[51] Int. Cl.$^6$ .............................. B32B 7/02; C08G 63/18
[52] U.S. Cl. ...................... 428/221; 528/272; 528/298; 528/302; 528/308; 528/308.6; 428/357
[58] Field of Search .................................. 528/272, 298, 528/302, 307, 308, 308.6; 428/357, 221

[56] References Cited

U.S. PATENT DOCUMENTS

| | | | |
|---|---|---|---|
| 2,901,466 | 8/1959 | Kibler et al. | 528/288 |
| 3,161,710 | 12/1964 | Turner | 264/216 |
| 5,153,302 | 10/1992 | Masuda et al. | 528/272 |
| 5,219,911 | 6/1993 | Minnick | 524/311 |

OTHER PUBLICATIONS

Research Disclosure 29481, "Poly(1,4–Cyclohexylenedimethylene 2,6–Naphthalenedicarboxylate) Polymers and Copolymers Containing Aromatic Acids", Oct., 1988.
Journal of Applied Polymer Science, 20, pp. 1209–1215, 1976.

*Primary Examiner*—Samuel A. Acquah
*Attorney, Agent, or Firm*—Cheryl J. Tubach; Harry J. Gwinnell

[57] ABSTRACT

Disclosed are orientable, heat setable, semi-crystalline copolyesters which have high glass transition temperatures. These copolyesters have high heat distortion temperatures along with excellent molding and film properties which makes them useful in packaging materials and molded parts. These copolyesters have repeat units from about 100 mol % 1,4-cyclohexanedimethanol, about 1–99 mol % terephthalic acid and about 99-1 mol % naphthalene dicarboxylic acid.

4 Claims, No Drawings

# ORIENTABLE, HEAT SETABLE SEMI-CRYSTALLINE COPOLYESTERS

TECHNICAL FIELD

This invention relates to orientable, heat setable, semi-crystalline copolyesters which have high glass transition temperatures. These copolyesters have high heat distortion temperatures along with excellent molding and film properties which makes them useful in packaging materials and molded parts.

BACKGROUND OF THE INVENTION

Polyesters that are crystalline and have high heat distortion temperatures along with other good molding and film properties are becoming more and more in demand in such applications as fibers, photographic film, computer boards and other applications that require a polymer to be crystalline, orientable, subject to heat-set and which can withstand high temperatures. A copolyester system which is crystalline, suitable for high temperature end use and has practical application in film, fibers and molded parts, and packaging has now been unexpectedly found.

Two patents, U.S. Pat. Nos. 2,901,466 and 3,161,710, and Research Disclosure 29481 (October, 1988) mention copolyesters comprised of dimethylterephthalate, dimethyl 2,6-napthalene dicarboxylate and 1,4-cyclohexane dimethanol. These patents and disclosure are concerned with polymers and copolymers of poly (1,4-cyclohexylene dimethylene terephthalate) and copolymers thereof. They mention copolymers containing up to 50 mole percent 2,6-naphthalene dicarboxylic acid, and there is no mention of isomer ratios in copolyesters of poly (1,4-cyclohexylene dimethylene terephthalate) with dimethyl 2,6-napthalene dicarboxylate. Copolyesters containing from 1 to 99 mole percent 2,6-napthalene dicarboxylate or 1 to 99 mole percent of terephthalate and 0 to 100 mole percent cis isomer of 1,4-cyclohexanedimethanol and all copolyesters containing all cis/trans isomer ratios between 0 and 100 percent are presently of particular interest.

DESCRIPTION OF THE INVENTION

According to the present invention, there are provided orientable, heat-setable, semi-crystalline copolyesters having a melting point greater than about 200° C., glass transition temperature (Tg) of greater than 70° C., a heat of fusion ($\Delta$Hg) of greater than 0.1 cal/g, the copolyesters having repeat units from about 100 mol % 1,4-cyclohexanedimethanol, about 1–99 mol % terephthalic acid and about 99-1 mol % naphthalene dicarboxylic acid, and the copolyester having an I.V. of about 0.5 to 1.1.

The preferred copolyesters have a Tg of greater than 80° C., $\Delta$Hg of greater than 0.1 cal/g, repeat units from about 100 mol % CHDM, repeat units from about 50 mol % terephthalic acid and repeat units from about 50 mol % naphthalene dicarboxylic acid.

Conventional processes well known in the art may be used for producing the copolyesters from terephthalic acid or lower dialkyl esters thereof, 2,6-naphthalene dicarboxylic acid or lower dialkyl esters thereof, and 1,4-cyclohexanedimethanol. According to this invention, either the cis or trans isomer of 1,4-cyclohexanedimethanol can be used.

Terephthalic acid and 2,6-naphthalene dicarboxylic acid and their lower dialkyl esters (especially dimethyl esters) as well as 1,4-cyclohexanedimethanol are well known, commercially available monomers.

In general, the copolyesters are prepared using a combination of first, melt-phase and then solid-phase esterification and polycondensation, both processes being well known in the art. The process is continued until the desired I.V. (inherent viscosity) is reached.

In addition, the polymer can include various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments.

Following preparation, the copolyesters are normally pelletized by well known means, and are subsequently formed into useful articles such as by extrusion, injection molding, combinations of extrusion or injection molding with blow molding, etc.

EXAMPLES

The following examples are submitted for a better understanding of the invention.

Example 1—In a 500 mL round bottom flask equipped with a ground glass head, a stirrer shaft, nitrogen inlet and side arm is charged 67.9 grams (0.35 moles) of dimethyl terephthalate, 36.6 grams (0.15 moles) of dimethyl 2,6-napthalene dicarboxylate, 79.2 grams (0.55 moles) of 1,4-cyclohexane dimethanol (70/30) trans/cis mixture, and 1.42 mL of a butanol solution of titanium tetraisopropoxide containing 0.0102 gram of titanium per mL. The flask is immersed in a Belmont metal bath preheated to 200° C. and as soon as the flask is immersed the temperature of the bath is reset to increase to 290° C. The reaction mixture is stirred for approximately 45 minutes until the bath temperature reaches 290° C. after this time the theoretical amount of methanol has been collected and the pressure in the flask is reduced to 0.1 to 0.5 mm of Hg. The temperature is maintained at this pressure for 1 hour. The metal bath is then lowered away from the flask, the vacuum outlet is clamped off, the nitrogen inlet is opened and the flask is allowed to come to atmospheric pressure under a nitrogen blanket. The copolymer is allowed to cool to room temperature. This melt phase prepared copolyester has an inherent viscosity of 0.79. This is a typical laboratory preparation of copolyesters disclosed in this invention.

Examples 2, 3 and 4 (Table 1) show film tensile properties obtained from copolyesters of dimethyl terephthalate and dimethyl 2,6-napthalene dicarboxylate with varying amounts of 2,6-napthalene dicarboxylate and 1,4-cyclohexane dimethanol with an isomer content from 99.5% trans to 94.7% cis and dimethyl 2,6-napthalene dicarboxylate content of 30 and 50 mole %. All of these copolyesters have glass transition temperatures greater than 80° C. and 100% trans 1,4-cyclohexane dimethanol polymer with a Tg greater than 100° C. and all show crystalline melting points. Examples 7 and 8 with 30 and 50 mole percent 2,6-napthalene dicarboxylate demonstrate the improved processability caused by the copolymerization of polymers of 2,6-napthalene dicarboxylic acid and 70/30 trans cis 1,4-cyclohexane dimethanol which melts well above 325° C. and as a consequence is impossible to melt process without degrading the polymer to an extent it is no longer useful. The copolymerization with dimethyl terephthalate and/or high cis content 1,4-cyclohexane dimethanol lowers the process temperature of the copolyesters containing high contents of 2,6-napthalene dicarboxylate while remaining crystalline and showing glass transition temperatures considerably higher than normal commercial polyesters of around 80° C. These modifications enhance the processability to a less degradable and useful processing temperature while providing a copolyester which is still crystalline and has a much higher than normal glass transition temperature which make these polyesters useful when a polymer with high heat distortion and which can be used at a much hotter temperature without excessive shrinkage.

Examples 5, 6, and 7 (Table 2) show film properties of copolyester prepared using a 70/30 trans/cis content of 1,4-cyclohexanedimethanol and containing 10, 20 and 30 mole % 2,6-dimethyl naphthalate. These copolyesters are crystalline with higher than normal glass transition temperatures and have excellent film properties as shown in Table 2.

Examples 8 and 9 shown in Table 3 are copolyesters prepared from 70/30 trans/cis 1,4-cyclohexanedimethanol and copolymerized with 50 and 75 mole % 2,6-dimethyl-napthalene-dicarboxylate and dimethylterephthalate which show good molding properties and again are crystalline as shown by the melting points and have high glass transition temperatures and heat distortion temperatures at 66 psi of at least 100° C.

These examples show the unexpected isomorphism (all copolymers in the family show crystallinity) and examples of film and molding properties that are useful with glass transition temperatures that are beneficial for use at high temperatures.

TABLE 1

| | Example Number | | |
|---|---|---|---|
| | 2 | 3 | 4 |
| Composition | 70% dimethyl terephthalate 30% 2,6-dimethyl naphthalate 100% (94.7% Cis) cyclohexane-dimethanol | 50% dimethyl terephthalate 50% 2,6-dimethyl naphthalate 100% (94.7% Cis) cyclohexane-dimethanol | 70% dimethyl terephthalate 30% dimethyl naphthalate 100% (99.5% Trans) cyclohexane-dimethanol |
| I.V. (melt phase) | 0.748 | 0.714 | 0.661 |
| DSC (C) 2nd cycle | | | |
| Tg | 86.5 | 93.6 | 109.9 |
| Tch | 175.5 | none | 181.3 |
| Tm | 214.2 | 204.7 | 279.3 |
| Tcc | none | none | 184.7 |
| D882 (23 C. and 50% RH) | | | |
| Yield Stress, psi (MPa) | | | |
| MD | 12442 (85.8) | 14462 (99.7) | 12643 (87.2) |
| TD | 12681 (87.4) | 14003 (96.5) | 12302 (84.8) |
| Yield Strain (%) | | | |
| MD | 6.4 | 7.5 | 8.8 |
| TD | 5.8 | 7.3 | 7.8 |
| Break Stress, psi (MPa) | | | |
| MD | 16172 (111.5) | 16203 (111.7) | 12944 (89.2) |
| TD | 15585 (107.5) | 15966 (110.1) | 14444 (99.6) |
| Break Strain, psi (MPa) | | | |
| MD | 208.4 | 158.6 | 170.6 |
| TD | 174.5 | 152.4 | 176.9 |
| Young's Modulus psi (MPa) | | | |
| MD | 391055 (2696) | 405737 (2797) | 317929 (2192) |
| TD | 399566 (2755) | 401191 (2766) | 302592 (2086) |
| Energy/Vol at Break, in.-lb/cu. in. (N-mm/Cu. mm) | | | |
| MD | 24862 (171) | 20402 (141) | 19474 (4611) |
| TD | 21063 (145) | 19508 (135) | 20455 (141) |

TABLE 2

| | Example Number | | |
|---|---|---|---|
| | 5 | 6 | 7 |
| Composition | 90% dimethyl terethalate 10% 2,6-dimethyl naphthalate 100% (30% Cis) cyclohexane-dimethanol | 80% dimethyl terephthalate 20% 2,6-dimethyl naphthalate 100% (30% Cis) cyclohexane-dimethanol | 70% dimethyl terephthalate 30% dimethyl naphthalate 100% (30% cis) cyclohexane-dimethanol |
| I.V. (extruded film) | 0.693 | 0.694 | 0.747 |
| DCS (C) 2nd cycle | | | |
| Tg | 98.1 | 99.1 | 104.7 |
| Tch | 136.7 | 169.9 | 196.8 |
| Tm | 277.2 | 264.1 | 251.3 |
| Tcc | 172.3 | 162.4 | 154.6 |
| D882 (23° C. and 50% RH) | | | |
| Yield Stress, psi (MPa) | | | |
| MD | 11131.8 (76.8) | 12406.9 (85.5) | 12740 (87.8) |
| TD | 11504.9 (79.3) | 11982.4 (82.6) | 13197 (91) |
| Yield Strain (%) | | | |
| MD | 10.2 | 11.8 | 11.7 |
| TD | 10.4 | 10.4 | 13.2 |
| Break Stress, psi (MPa) | | | |
| MD | 18040.5 (124.4) | 15370.4 (106.0) | 20474.1 (141.2) |
| TD | 19191.3 (132.3) | 21294.4 (146.8) | 20454.9 (141) |
| Break Strain (%) | | | |
| MD | 69.7 | 40.9 | 53.9 |
| TD | 72.2 | 69.2 | 59.1 |
| Young's Modulus, psi (MPa) | | | |
| MD | 303934 (2096) | 282195 (1946) | 283995 (1958) |
| TD | 307868 (2123) | 285799 (1971) | 290963 (2006) |
| Energy/Vol at | | | |

TABLE 2-continued

| | Example Number | | |
|---|---|---|---|
| | 5 | 6 | 7 |
| Break, in.-lb/ cu. in. (N-mm/ Cu. mm) | | | |
| MD | 9441 (65) | 5282 (36) | 8159 (56) |
| TD | 10015 (69) | 10267 (71) | 8759 (60) |

TABLE 3

| | Example Number | |
|---|---|---|
| | 8 | 9 |
| Composition | 50% dimethyl terephthalate 50% 2,6-dimethyl naphthalate 100% (30% Cis) cyclohexane-dimethanol | 25% dimethyl terephthalate 75% 2,6-dimethyl naphthalate 100% (30% Cis) cyclohexane-dimethanol |
| I.V. | | |
| (before molding) | 0.82 | 0.80 |
| (after molding) | 0.78 | 0.67 |
| DSC (C) 2nd cycle | | |
| Tg | 113 | 124 |
| Tch | 192 | 176 |
| Tm | 249 | 291 |
| Tcc | none | 237 |
| Density (after molding) | 1.206 | 1.204 |
| Mold Shrinkage, % | 0.76 | 0.56 |
| Rockwell Hardness, | | |
| R | 119 | 119 |
| L | 86 | 96 |
| HDT, | | |
| @ 66 psi | 100° C. | 107° C. |
| @ 264 psi | 82° C. | 83° C. |
| Molding Properties (D638) | | |
| yield stress, psi | 7460 | 7580 |
| elong yield, % | 6 | 8 |
| elong break, % | 134 | 70 |
| break stress, psi | 8750 | 8060 |
| tensile strength, psi | 8750 | 8210 |
| flexural strength, psi | 11030 | 11470 |
| flexural modulus, psi | 222000 | 247000 |
| notched izod, ft-lb/in. @ 23° C. | 1.38 (100%) CB | 1.68 (100%) CB |
| notched izod, ft-lb/in. @ −40° C. | 0.75 (100%) CB | 0.46 (100%) CB |
| unnotched izod, ft-lb/in. @ 23° C. | 49.9 (100%) NB | 30.9 (100%) NB |
| unnotched izod, ft-lb/in. @ −40° C. | 17.8 (100%) CB | 11.0 (100%) CB |

The "heat of fusion", ΔHg, of polymers is the amount of heat evolved when crystallizable polymers are melted. ΔHg values are readily obtained using Differential Scanning Calorimeters (Perkin-Elmer). For example, one method for determining ΔHg is described in *Journal of Applied Polymer Science*, 20 1209 (1976). Measurement of ΔHg is also described in duPont Thermal Analysis Bulletin No. 900-8 (1965). Qualitatively, it is possible to compare the degree of crystallinity of polymers by comparing their ΔHg values.

I.V. is measured in a 60/40 parts by weight solution of phenol/tetrachloroethane 25° C. and at a concentration of about 0.5 gram of polymer in 100 mL of the solvent.

ASTM D638 procedure is used to determine the following physical properties:

Yield Stress

Elongation Yield

Elongation Break

Tensile Strength

Flexural Strength

Flexural Modulus

Notched Izod

Unless otherwise specified, all parts, ratios, percentages, etc., are by weight. Temperatures are measured by DSC (differential scanning calorimetry).

The invention has been described in detail with particular reference to preferred embodiments thereof, but it will be understood that variations and modifications can be effected within the spirit and scope of the invention.

I claim:

1. Orientable, heat-setable copolyesters having a melting point greater than about 200° C., a Tg of greater than 70° C. and an I.V. of about 0.5 to 1.1, being semi-crystalline with a ΔHg of greater than 0.1 cal/g, and said copolyesters consisting essentially of repeat units from a glycol component of about 100 mol % 1,4-cyclohexane-dimethanol with a cis isomer ratio of 0–100 % and an acid component of about 1 to less than 90 mol % terephthalic acid and than 10 to 99 mol % naphthalene dicarboxylic acid.

2. Copolyesters according to claim 1 wherein the Tg is >80, the ΔHg is >0.1 cal/g and said copolyesters contain repeat units from about 100 mol % 1,4-cyclohexanedimethanol, about 50 mol % terephthalic acid and about 50 mol % naphthalene dicarboxylic acid.

3. A film or sheet comprising the copolyester of claim 1.

4. A molded article comprising the copolyester of claim 1.

* * * * *

UNITED STATES PATENT AND TRADEMARK OFFICE
CERTIFICATE OF CORRECTION

PATENT NO. : 5,616,404
DATED : April 1, 1997
INVENTOR(S) : Bobby Jones Sublett

It is certified that error appears in the above-indentified patent and that said Letters Patent is hereby corrected as shown below:

Column 6, line 44 (Claim 1, line 8), between "and" and "than", —— greater —— should be inserted.

Signed and Sealed this

Fifteenth Day of July, 1997

Attest:

BRUCE LEHMAN

Attesting Officer

Commissioner of Patents and Trademarks